United States Patent [19]
Wiltrout

[11] 3,911,938
[45] Oct. 14, 1975

[54] FULLY AUTOMATIC VEHICLE WASH WATER RECLAIM SYSTEM

[75] Inventor: Dale E. Wiltrout, Wyckoff, N.J.

[73] Assignee: The Allen Group Inc., Melville, N.Y.

[22] Filed: Nov. 28, 1973

[21] Appl. No.: 419,807

[52] U.S. Cl. ............... 134/104; 134/109; 134/123; 210/108
[51] Int. Cl.² .......................................... B08B 3/02
[58] Field of Search ............ 134/45, 104, 109, 111, 134/123; 210/275, 108, 242

[56] References Cited
UNITED STATES PATENTS

| | | | |
|---|---|---|---|
| 3,421,835 | 1/1969 | McCarty | 210/82 |
| 3,739,913 | 6/1973 | Bogosian | 210/242 |
| 3,774,625 | 11/1973 | Wiltrout | 134/104 |

*Primary Examiner*—Robert L. Bleutge
*Attorney, Agent, or Firm*—Fulwider, Patton, Rieber, Lee & Utecht

[57] ABSTRACT

The automatic vehicle wash water reclaim system of the present invention includes wash and rinse spray arches for spraying wash and rinse water on a vehicle located in wash and rinse bays. A collection sump is provided for receiving used wash water drained from the wash bay and includes a partition separating such sump into a water collection and skimmer compartment and a water storage compartment. A wash water pump is provided for drawing water from the wash water sump and pressurizing the wash spray arch. A separator is provided for separating water from sludge and a separator pump is provided for drawing water from the collector compartment and directing it to such separator for the separation of the clean water from the sludge for return to the storage compartment. A rinse water collection sump is provided for receiving used rinse water drained from the rinse bay and a rinse water pump is included for drawing water from such sump to direct it through a series of filters and to the rinse arch. The filter series includes two stages of filter tanks, each stage having their inlets and outlets connected in parallel and the inlets of the first stage being connected to the rinse pump discharge and the inlets of the second stage being connected with the outlets of the first stage. The outlets of the second stage are connected in parallel direct to the rinse arch. The filter tank inlets are also connected together by means of a back wash manifold and such back wash manifold leads to both the wash sump and the rinse sump when both are used. Valving is provided in the filter arrangement for selectively directing all the water from the sump in a forward direction, to flow in sequence through the first stage and then the second stage of filters and for selectively directing the water from such pump forwardly through all but one of the filter tanks and in a back flow direction through the remaining tank to thereby enable back washing of each of such filter tanks with water drawn and filtered by all filters except one from the rinse sump. Automatic control means is provided for controlling the pump and filter valving arrangement. An electromechanical system may be provided to chemically treat both the used wash and rinse water as each is recirculated to the collection sump.

10 Claims, 1 Drawing Figure

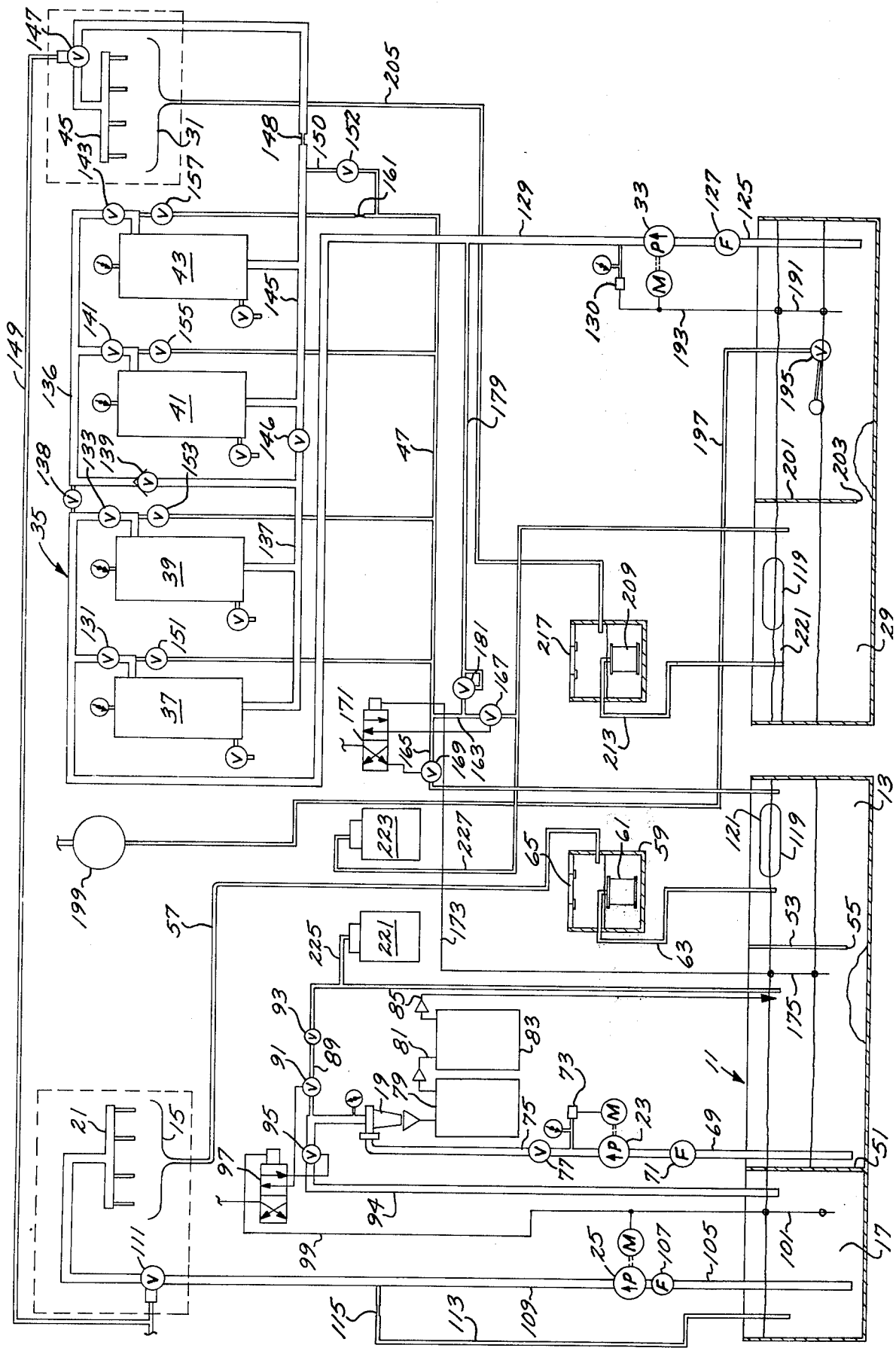

FULLY AUTOMATIC VEHICLE WASH WATER RECLAIM SYSTEM

BACKGROUND OF THE INVENTION

1. Field of the Invention

With the present day high cost of labor and the unreliability of low paid personnel frequently employed by vehicle wash installations, automatic vehicle washing mechanisms have gained in popularity. Such mechanisms frequently require use of high volumes of water and the addition of detergents and the like to such water in order to provide for fully effective washing with only a minimum of labor.

With the advent of pollution control legislation and water shortages throughout the country, it is becoming necessary for such vehicle washing installations to minimize the quantity of water taken from municipal water lines and to closely control the quality of waste water returned to the city sewers. Further, with the present day high cost of water and sewage disposal, vehicle washing installations have found it economically desirable to reclaim the used water employed in washing vehicles and to process such water for reuse. This necessitates separation of grit and sludge-like material from the water used in the initial wash cycle to clean such water for reuse in the wash cycle. By leaving certain quantites of detergent in such wash water, the necessity of adding additional detergent is minimized or, even, eliminated. Further, it is desirable to reclaim the water used in the final rinse of the vehicle and to filter and treat such water sufficiently to enable reuse thereof without leaving residue and stains on subsequent vehicles being washed by the reclaimed water.

2. Description of the Prior Art

Many efforts have been made to provide effective and economical water reclaim systems for reclaiming substantially all or part of the water used in vehicle washing facilities. Reclaim systems of this type have been provided which include a wash sump separated into a collector compartment receiving water drained from a wash bay and a clean water compartment, the water being drawn from the collector compartment and recirculated direct to the wash arch or passed through a sludge separator to the arch or for return to the collection sump. Some systems also incorporate a rinse water collection sump separated into a collector compartment and clean water compartment, the water from the rinse bay being drained into the collector compartment and then drawn therefrom for passage through rinse filters and returned to the clean water compartment from where it was subsequently withdrawn to pressurize rinse spray means for spraying rinse water on vehicles as they pass through the rinse bay. A system of this type has been available from Ultra Dynamics, Corporation, 11650 West Olympic Boulevard, Los Angeles, Calif. 90064 under the Model No. T60/40.

Systems of this type suffer shortcomings in that they are not fully automatic, fresh water is required to periodically backwash the filter tanks thus resulting in unnecessary consumption of relatively large amounts of fresh water, and have short filter life, due to low efficiency cleaning, resulting in high operational costs.

SUMMARY OF THE INVENTION

The automatic vehicle wash water reclaim system of the present invention is characterized by automated means for withdrawing water from a wash water collection sump for separating the sludge therefrom and at the same time chemically treating the used water recirculated back to the sump or returning same to a wash water storage compartment in such sump and/or to pressurize a wash spray means in the wash bay. Automated means is also provided for withdrawing used water from a rinse water collection sump, chemically treating said used water and directing it through a filter arrangement to a rinse arch, or storage, such filter arrangement including a plurality of pairs of filter tanks with pairs thereof being connected in series. A valving arrangement is provided for connecting the outlets of at least a pair of such filters in parallel with the outlet of a single remaining filter tank for back washing such single filter with the entire volume of water passed through such pair of filters.

The objects and advantages of the present invention will become apparent from a consideration of the following detailed description when taken in conjunction with the accompanying drawing.

DESCRIPTION OF THE DRAWING

The single FIGURE in the drawing is a schematic diagram of an automatic vehicle wash water reclaim system embodying the present invention.

DESCRIPTION OF THE PREFERRED EMBODIMENT

GENERAL CONSTRUCTION

The automatic vehicle wash water reclaim system of the present invention includes, generally, a wash sump 11 separated into a collector compartment 13 which receives water from a wash bay drain 15 through screening pit 59 and a clean water compartment 17 which receives water from a sludge separator 19 and has water drawn therefrom for spraying through a wash spray arch 21. Automatic separator pumps 23 and 25 are provided for drawing water from the respective collector compartment 13 and clean water compartment 17. A rinse sump 29 has water fed thereto from a rinse drain 31 through screening pit 207 and water drawn therefrom by means of an automatic rinse pump 33 which directs such water through a filtering arrangement 35 including a pair of normally parallel connected first stage filter tanks 37 and 39 which are normally connected in series with a pair of parallel connected second stage filter tanks 41 and 43. The outlets from the second stage filter tanks 41 and 43 are normally connected with a rinse spray arch 45 and the inlets of the filter tanks 37, 39, 41 and 43 may selectively be connected with a back wash manifold 47 leading selectively to either the rinse sump 29 or wash sump 11. Consequently, water drained from the wash bay drain 15 may be selectively withdrawn from the sump 11 and directed through the sludge separator 19 to separate the sludge therefrom and return the clean water back to the clean water compartment 17 for subsequent withdrawal to spray through the wash arch 21 or recirculated back to the main holding sump 11. Similarly, used water may selectively be withdrawn from the rinse sump 29 for direction through the parallel connected first stage filter tanks 37 and 39 and subsequent direction through the parallel connected second stage filter tanks 41 and 43 to pressurize the rinse spray arch 45. After a period of use, it becomes necessary to back wash the filter tanks 37, 39, 41 and 43 and each such filter tank may be individually back washed by adjusting the valving arrangement thereto to direct the water from the rinse pump 33 in a forward direction through three of the filters and in a reverse direction through the remaining filter tank and then from such fourth filter tank back to either the rinse or wash sumps 29 or 11.

WASH SYSTEM

The wash sump 11 is normally disposed below the level of the wash bay and in order to accommodate the volume of water necessarily recycled from a high speed vehicle wash apparatus, such sump is normally six or seven feet deep. The sump 11 is separated by means of a partition 51 to form the collector and clean water compartments 13 and 17, respectively, and a skimmer baffle 53 extends transversely across and projects downwardly in the collector compartment 13 to terminate in a lower edge 55 spaced approximately two feet from the bottom wall of the sump 11. Used water from the wash bay drain 15 is fed therefrom through a drain conduit 57 which dumps into a relatively shallow two foot deep screening pit, generally designated 59, disposed at ground level and having a cylindrically shaped filter screen 61 disposed therein. Leading from the core of the filter screen 61 is a sump conduit 63 which leads to the wash sump 11 on one side of the skimmer 53. A metal plate 65 covers the access opening in the top of the screening pit 59 to enable convenient removal of the filter screen 61 for cleaning or replacement thereof.

Leading from the collector compartment 13 on the side of the skimmer 53 opposite the side on which the sump conduit 63 dumps is a withdrawal conduit 69 connected with the separator pump 23 and having a filter 71 therein. A pressure sensor 73 senses the pressure discharge of the pump 23 and is responsive to a predetermined pressure drop to render such pump 23 inoperative thereby signalling the operator, by audio and visual means, that the filter 71 has been sufficiently clogged to restrict flow to the pump 23 below the desired level. A separator conduit 75 leads from the outlet of the pump 23 to the inlet of the sludge separator 19 and includes a shut-off valve 77.

The sludge separator 19 is in the form of a centrifugal separator and has its sludge outlet connected with the top of a disposable sludge collection drum 79, a conduit 81 leading from the top of such sludge drum to a second sludge drum 83 which has a water return conduit 85 connected with the top thereof and leading back to the collector compartment 13 so water rising to the top of the drums 79 and 83 may be returned to such collector compartment, while the sludge is deposited in the bottom of the drum or drums.

The water outlet from the sludge separator 19 is connected with a recycle conduit 89 leading back to the collector compartment 13 and including a pneumatically operated, normally open valve 91 and a manual adjustment valve 93. The outlet from such separator is also connected with a clean water return conduit 94 including a normally closed pneumatic operated valve 95. The pneumatic valves 91 and 95 are controlled by a spool valve 97 having a sensing line 99 projecting therefrom to connect with a high and low water level sensor 101 disposed in the clean water compartment 17 for automatic actuation of such valves 91 and 95 to direct water to either the clean water compartment 17 or recirculate to the collector compartment 13 where chemicals are injected, depending upon the demand for such water in such clean water compartment.

A take-up pipe 105 leads from the clean water compartment 17 to the wash pump 25 and includes a filter 107, the outlet from such pump 25 being connected with the wash arch 21 by means of a wash conduit 109 including an inner actuated valve 111. A blow back conduit 113 branches off from the wash conduit 109 and returns to the clean water compartment 17, such blow back conduit including a flow control valve 115 which is responsive to the pressure in such wash conduit 109 to control the blow back rate thereby enabling the wash pump 25 to be operated at a constant speed without overheating while maintaining a substantially constant pressure at the wash arch 21.

Floating on the water in the collector compartment 13 is an oil and wax absorbing pillow 119 having a coarse mesh net 121 wrapped therearound and secured to the wall of the sump 11 for convenient removal thereof for periodic removal of oil and wax collected therein. This is a unique part of the system.

RINSE SYSTEM

A take-up conduit 125 leads from the rinse sump 29 to the inlet of the rinse water pump 33 and includes a filter 127, the outlet from such pump being connected in parallel with the inlets to the first stage filter tanks 37 and 39 by means of a filter conduit 129.

A pressure sensor 130 is connected to the discharge of the rinse pump 33 to sense the pressure thereof and turn such pump off and turn on an audio and visual alarm when the pressure drop thereacross falls below a predetermined level to thereby indicate clogging of the filter 127 and inadequate pressure and flow for the system to operate properly.

A level sensor 191 is disposed in the rinse sump 29 and a sensor line 193 leads therefrom to a control panel (not shown). Water flow to the inlets of the filter tanks 37 and 39 is controlled by respective air actuated valves 131 and 133. The outlets from the respective tanks 37 and 39 are connected in parallel by means of a first stage outlet conduit 137 and a second stage inlet conduit 136 which connects with the inlets to the respective second stage filters 41 and 43, such conduit 137 including a one-way check valve 139. A pneumatic operated wash valve 138 connects the filter conduit 129 with the second stage inlet conduit 136. Flow to the respective inlets of the second stage filter tanks 41 and 43 is controlled by respective air actuated valves 141 and 143. The outlets from the second stage filter tanks 41 and 43 are connected together by means of a rinse conduit 145 leading to the rinse arch 45 and including a flow control valve 148 and an air actuated valve 147, the arch control valves 111 and 147 being connected with a pneumatic line 149. The rinse conduit 145 is connected with the first stage conduit 137 by means of a wash conduit including a pneumatic wash valve 146. A purge conduit 150 branches off from the rinse conduit 145 and leads to the back wash manifold 47 and includes a purge valve 152.

The inlets to the respective filter tanks 37, 39, 41 and 43 are connected with the back wash manifold 47, the flow from each inlet being controlled by respective back wash valves 151, 153, 155 and 157. The back wash manifold 47 includes a flow control valve 161 and branches into a rinse sump return line 163 and a wash sump return line 165, such lines including respective pneumatic normally open and normally closed valves 167 and 169. The valves 167 and 169 are operated by means of a spool valve 171 having a sensing line 173 leading therefrom and through a level sensor 175 which senses the water level in the collector compartment 13 to signal the need for make-up water in the wash sump 11. It will be noted that a blow back conduit 179 branches off from the filter conduit 129 and includes a flow control valve 181 which controls flow into the rinse sump return line 163 to thereby provide bypass from the rinse pump 33, and to transfer excess rinse water back to the wash sump 11.

A float valve 195 is disposed in such rinse sump 29 and controls flow from a fresh water conduit 197 leading from a water softener 199 for providing softened make-up water to the sump 29 as water evaporates during use and/or is carried from the rinse bay by vehicles being washed.

A skimmer baffle 201 projects transversely across the sump 29 and depends downwardly from the top thereof to terminate in a lower edge 203 spaced approximately two feet above the bottom of such sump 29 to provide for passage thereunder of water returned to the sump for subsequent withdrawal through the withdrawal conduit 123.

A drain conduit 205 leads from the rinse drain 31 to a relatively shallow rinse screen pit 207 having a removable cylindrical rinse screen 209 therein. A sump conduit 213 leads from the top of the screen 209 for returning water to the rinse sump 29. As in the case of the screen pit 59, the access opening in the top wall thereof is covered by a removable metal plate 217 to provide for convenient removal of the screen 209 for cleaning.

A pair of wash and rinse chemical feeders 221 and 223 are connected with the wash recycle conduit 89 to the wash sump 11 by means of a conduit 225 and with the rinse sump 29 by means of a chemical feed conduit 227, respectively, for selectively adding chemicals to treat the water in the respective sumps 11 and 29 to improve water quality.

An oil and wax absorbing pillow 119 is also disposed in the rinse sump 29 and is held captive in a coarse net 221 connected with the wall of such sump for convenient removal of such pillow for cleaning thereof.

OPERATION

In operation, the sumps 11 and 29 are filled to the desired level with water and the system energized and pressurized to commence automatic operation thereof. As a vehicle moves along the vehicle path into the wash bay, a sensor (not shown) is contacted to open the pneumatic wash and rinse valves 111 and 147 respectively to direct water to the arches 21 and 45 to spray water on such vehicle as it travels through the wash and rinse bays. Wash water draining from the vehicle is collected in the drain 15 and fed into the screen pit 59 where the screen serves to screen out larger particles of foreign material and return the screened, used water to the collector compartment 13 through the conduit 63. It will be appreciated that such returning water carries sludge, grit, wax and oil and such wax and oil will normally float on the water to be retained behind the skimmer 53 within the collector compartment 13 and be absorbed by the oil pillow 119. A portion of the sludge carried in the returning water will be deposited out as such water passes beneath the lower edge 55 of the skimmer 53 for withdrawal from such compartment by means of the separator pump 23.

Water withdrawn through the separator pump 23 is fed into the centrifugal sludge separator 19 and the separated sludge deposited in the sludge drums 79 and 83 and the clean water directed upwardly to normally be conducted through the open recycle valve 91 where it is chemically treated then recycled back to the collector compartment 13 for subsequent recycling to the separator 19. However, when the water level in the clean water compartment 17 drops sufficiently low to cause the level sensor 101 to signal the control valve 97, the recycle valve 91 will be closed and the make-up valve 95 opened to thereby direct the water from the separator 19 back to the clean water return conduit 94 to the clean water compartment 17 for subsequent withdrawal to the wash arch 21.

It will be appreciated that the rinse pump 33 normally directs water through the filter conduit 129 and through the inlets to the first stage filter tanks 37 and 39 to flow such water forwardly through such filters for discharge from the outlets thereof and to the inlets to the second stage filters 41 and 43 thereby providing for couble filtering of the water. The water discharged from the second stage filter tanks 41 and 43 is directed through the rinse conduit 145 to the rinse arch 45 to rinse the car as it passes through the rinse bay. Water collected from the rinse drain 31 is directed to the rinse screen pit 207 to return to the rinse sump 29 from where it passes beneath the skimmer 201 for subsequent withdrawal to the rinse pump 33.

After a period of use, the filter media in the tanks 37, 39, 41 and 43 needs cleaning and such filter tanks may be conveniently reactivated by back flowing thereof. When it is desirable to back flow the filter tank 37, the remaining filter tanks 39, 41 and 43 may be connected in parallel by closing the filter inlet valve 131 and opening the valves 146, 138 and 151. Operation of the rinse pump 33 will then flow water in a downward direction through the filter tanks 39, 41 and 43 and in an upward direction through the first stage filter 37 for exit from the inlet of such filter and through the back wash valve 151 to the back wash manifold 47. The water flowing through the back wash manifold 47 will normally be directed through the wash sump return valve 169 to the wash sump 11 but when the wash level sensor 175 detects a high water level in the wash sump 11, the control valve 171 will shift, thereby closing the wash sump valve 169 and opening the rinse sump valve 167 to direct water to such rinse sump 29. It will be appreciated that the remaining filter tanks 39, 41 and 43 may be back washed in a similar manner, each one at a time.

After back washing of each individual filter tank 37, 39, 41 and 43 has been completed, it is desirable to purge all such filter tanks by flowing water downwardly therethrough. This is accomplished by opening all the inlet valves 131, 133, 141 and 143 and closing all the back wash valves 151, 153, 155 and 157. Also, the purge valve 152 is open and the rinse pump 33 actuated to flow water through the filter conduit 129 and in a downward direction through all filter tanks.

As operation of the system continues, water sprayed from the arches 21 and 45 will be evaporated or carried away by the vehicles leaving the wash facilities, thereby necessitating addition of make-up water. The drop in water level within the rinse sump 29 will be sensed by the float valve 195 to admit such make-up water. Also, it will be apparent that, if desirable, a fresh water line may be connected directly to the suction of the wash and rinse pumps 23 and 33 respectively for priming, blow-back clean out of the suction and refill of the sumps.

From the foregoing, it will be apparent that the automatic vehicle wash water reclaim system of the present invention provides an economical and convenient means for reclaiming water from a vehicle wash installation and proceeding such water for re-use, thereby substantially decreasing the expense of adding fresh water and lessening the sewage disposal requirement of the installation. The system of the present invention is relatively foolproof in operation and requires very little operator attention.

Obviously, many modifications and variations of the present invention may be made with regard to the foregoing detailed description without departing from the spirit of the invention.

I claim:

1. An automatic vehicle wash water reclaim system comprising:
    wash spray means for spraying water onto a vehicle passing through a wash bay formed in a vehicle path;
    wash sump means disposed beneath said vehicle path for collecting used water from said vehicle path and including partition means separating said sump means into a collector compartment and a clean water compartment;
    wash drain means for draining water from said vehicle path into said collector compartment;
    first conduit means connected between said clean water compartment and said spray means and including first pump means for drawing water from said sump and spraying it through said spray means;
    a sludge separator for separating water from sludge;
    second conduit means leading from said collector compartment to the inlet of said sludge separator and including second pump means;
    third conduit means leading from the water outlet from said sludge separator to said clean water compartment;
    rinse spray means for spraying rinse water on a vehicle passing through a rinse bay formed in said vehicle path forwardly along said path from said wash bay;
    rinse sump means including partition means separating said rinse sump means into a rinse water collector compartment and a rinse clean water compartment;
    drain means for draining used rinse water from said rinse bay to said rinse sump;
    rinse conduit means leading from said clean rinse water compartment and including a rinse pump means;
    first and second pairs of reverse flow filter tanks having a forward and reverse flow direction;
    filter conduit means leading from said rinse pump outlet to said filter tanks and connecting said filter tank inlets of said first pair in parallel with said rinse pump, the outlets of said first pair of tanks with the inlets to the second pair of tanks and connecting the outlets of said second pair of filter tanks with said rinse spray means and also connecting said rinse pump in parallel with the inlets to all of said filter tanks;
    back wash conduit means connecting said filter tank inlets with said rinse sump;
    individual valve means in said filter conduit means for controlling flow from said rinse pump means to the inlets of said respective filter tank inlets and operative during filtering of said wash water to direct water forwardly in parallel flow through said first pairs of tanks and then in parallel through said second pairs of tanks, said valve means being further operative during back wash of said tanks to selectively direct flow forwardly through any selected three of said tanks and in the reverse direction through the remaining filter tank;
    individual valve means in said back wash conduit means for controlling flow from said tank inlets through said back wash conduit means;
    a make-up conduit means leading from the outlet from said filter tank to said wash sump; and
    control means for controlling said wash pump, separator pump, wash and rinse pumps and valve means.

2. Automatic vehicle wash water reclaim apparatus as set forth in claim 1 wherein:
    said valve means includes pneumatic actuators; and said control means includes pneumatic conduits leading to said pneumatic actuators.

3. Automatic vehicle wash water reclaim apparatus as set forth in claim 1 that includes:
    oil and wax absorbing pillows in said sump means.

4. Automatic vehicle wash water reclaim apparatus as set forth in claim 1 that includes:
    an oil and wax absorbing pillow in one of said sump means.

5. Automatic vehicle wash water reclaim apparatus as set forth in claim 1 that includes:
    a disposable sludge drum for collecting sludge from said separator.

6. Automatic vehicle wash water reclaim apparatus as set forth in claim 1 wherein:
    said wash sump includes a skimmer projecting downwardly from the top wall thereof along a line intermediate the inlet to said sump means from said wash bay drain and the inlet to said wash water conduit, said skimmer terminating at a lower edge spaced from the bottom of said wash sump.

7. Automatic vehicle wash water reclaim apparatus as set forth in claim 1 wherein:
    said partition means in said rinse sump means is in the form of a skimmer projecting across said rinse sump means at a point intermediate the inlet to said sump means from said rinse bay drain and the inlet to said rinse pump conduit means and projecting downwardly from the top wall of said sump means to terminate in a lower edge spaced from the bottom of said sump means.

8. Automatic vehicle wash water reclaim apparatus as set forth in claim 1 wherein:
    said wash drain means includes a shallow screen pit, a conduit leading from the wash bay to said drain pit, a drain screen disposed in said screen pit and a sump conduit leading from said screen pit to said wash sump means.

9. Automatic vehicle wash water reclaim apparatus as set forth in claim 1 wherein:

said rinse bay drain means includes a shallow screen pit, a conduit leading from said rinse bay to said screen pit, a screen in said screen pit and a sump conduit leading from said screen to said rinse sump means.

10. Automatic vehicle wash water reclaim apparatus as set forth in claim 1 that includes:

a recycle conduit leading from the water outlet from said sludge separator to said collector compartment in said wash sump.

* * * * *

UNITED STATES PATENT OFFICE
CERTIFICATE OF CORRECTION

Patent No. 3,911,938              Dated   October 14, 1975

Inventor(s)   Dale E. Wiltrout

It is certified that error appears in the above-identified patent and that said Letters Patent are hereby corrected as shown below:

In the claims, Column 7, line 36, delete "first" and insert
   -- wash --; line 42, delete "second" and insert -- separator --
line 57, delete "a".
Column 8, line 4, after "with" insert -- one of --; after "sump" insert -- means --; line 22, delete "wash"; delete "pumps" and insert -- pump means --; after "and" insert -- said --.

Signed and Sealed this tenth Day of February 1976

[SEAL]

Attest:

RUTH C. MASON  
*Attesting Officer*

C. MARSHALL DANN  
*Commissioner of Patents and Trademarks*